US009176801B2

(12) United States Patent
Baeuerle et al.

(10) Patent No.: US 9,176,801 B2
(45) Date of Patent: Nov. 3, 2015

(54) ADVANCED DATA MODELS CONTAINING DECLARATIVE AND PROGRAMMATIC CONSTRAINTS

(71) Applicants: Stefan Baeuerle, Walldorf (DE); Timm Falter, Walldorf (DE); Daniel Hutzel, Walldorf (DE); Lior Schejter, Walldorf (DE); Daniel Zoch, Walldorf (DE); Andreas Bader, Walldorf (DE)

(72) Inventors: Stefan Baeuerle, Walldorf (DE); Timm Falter, Walldorf (DE); Daniel Hutzel, Walldorf (DE); Lior Schejter, Walldorf (DE); Daniel Zoch, Walldorf (DE); Andreas Bader, Walldorf (DE)

(73) Assignee: SAP SE, Walldorf (DE)

( * ) Notice: Subject to any disclaimer, the term of this patent is extended or adjusted under 35 U.S.C. 154(b) by 208 days.

(21) Appl. No.: 14/020,672

(22) Filed: Sep. 6, 2013

(65) Prior Publication Data

US 2015/0074069 A1 Mar. 12, 2015

(51) Int. Cl.
*G06F 7/02* (2006.01)
*G06F 17/30* (2006.01)
*G06F 11/07* (2006.01)
*G06F 9/45* (2006.01)
*G06F 9/44* (2006.01)

(52) U.S. Cl.
CPC .............. *G06F 11/0751* (2013.01); *G06F 8/35* (2013.01); *G06F 8/41* (2013.01); *G06F 17/3051* (2013.01); *G06F 17/30294* (2013.01); *G06F 17/30371* (2013.01); *G06F 17/30424* (2013.01)

(58) Field of Classification Search
CPC .............. G06F 17/3051; G06F 17/30; G06F 167/30294; G06F 17/30371; G06F 17/30383; G06F 17/30424
See application file for complete search history.

(56) References Cited

U.S. PATENT DOCUMENTS

| | | |
|---|---|---|
| 5,761,493 A | 6/1998 | Blakeley et al. |
| 5,999,908 A | 12/1999 | Abelow |
| 6,038,558 A | 3/2000 | Powers et al. |
| 6,195,709 B1 | 2/2001 | Gupner et al. |
| 6,516,310 B2 | 2/2003 | Paulley |
| 6,560,598 B2 | 5/2003 | Delo et al. |
| 6,567,798 B1 | 5/2003 | Hollberg et al. |
| 6,631,382 B1 | 10/2003 | Kouchi et al. |
| 6,732,084 B1 | 5/2004 | Kabra et al. |
| 6,799,184 B2 | 9/2004 | Bhatt et al. |
| 6,836,777 B2 | 12/2004 | Holle |
| 6,898,603 B1 | 5/2005 | Petculescu et al. |
| 6,938,041 B1 | 8/2005 | Brandow et al. |
| 6,996,568 B1 | 2/2006 | Bedell et al. |
| 7,107,497 B2 | 9/2006 | McGuire et al. |
| 7,194,744 B2 | 3/2007 | Srivastava et al. |
| 7,225,197 B2 | 5/2007 | Lissar et al. |

(Continued)

OTHER PUBLICATIONS

Pattern: "Fill Transient Attributes of Persistent Nodes"; SAP; Jul. 6, 2013; p. 1.

(Continued)

*Primary Examiner* — Bruce Moser
(74) *Attorney, Agent, or Firm* — Fountainhead Law Group PC

(57) ABSTRACT

A database language is extended to define constraints on a data model (e.g., entity-relationship model) rather than the concrete database. The constraints can be declarative (e.g., constraints that are defined using expressions of the database language) or programmatic (e.g., constraints that are defined as a stored procedure implemented in a domain specific language). By storing the constraints at a higher level than the database level, the constraints can be performed without changing the persistency of the database. Also disclosed are techniques for handling of constraints on partially loaded entities.

20 Claims, 10 Drawing Sheets

(56) References Cited

U.S. PATENT DOCUMENTS

| | | |
|---|---|---|
| 7,290,181 B2 | 10/2007 | D'Angelo et al. |
| 7,302,447 B2 * | 11/2007 | Dettinger et al. ............. 707/714 |
| 7,305,414 B2 | 12/2007 | Manikutty et al. |
| 7,340,451 B2 | 3/2008 | Sacco |
| 7,380,169 B2 | 5/2008 | Fossum et al. |
| 7,398,530 B1 | 7/2008 | Parla et al. |
| 7,421,448 B2 | 9/2008 | Spork |
| 7,434,230 B2 | 10/2008 | Harold et al. |
| 7,481,368 B2 | 1/2009 | Wang et al. |
| 7,505,983 B2 | 3/2009 | Wildhagen et al. |
| 7,523,090 B1 | 4/2009 | Sundman et al. |
| 7,640,357 B2 | 12/2009 | Kirov et al. |
| 7,653,828 B2 | 1/2010 | Kostadinov et al. |
| 7,680,782 B2 | 3/2010 | Chen et al. |
| 7,689,612 B2 | 3/2010 | Helsen et al. |
| 7,693,819 B2 | 4/2010 | Stoychev |
| 7,761,481 B2 | 7/2010 | Gaurav et al. |
| 7,765,222 B2 | 7/2010 | Styles et al. |
| 7,765,224 B2 | 7/2010 | Li et al. |
| 7,788,241 B2 | 8/2010 | Cheng et al. |
| 7,805,433 B2 | 9/2010 | Dickerman et al. |
| 7,818,754 B2 | 10/2010 | Morris et al. |
| 7,836,070 B2 | 11/2010 | Forstmann |
| 7,885,840 B2 | 2/2011 | Sadiq et al. |
| 7,895,226 B2 | 2/2011 | Koch et al. |
| 7,937,401 B2 | 5/2011 | Pasumansky et al. |
| 7,970,823 B2 | 6/2011 | Moeller et al. |
| 7,975,254 B2 | 7/2011 | Gilboa |
| 7,996,443 B2 | 8/2011 | Nori et al. |
| 8,005,850 B2 | 8/2011 | Walther et al. |
| 8,010,521 B2 | 8/2011 | Kissner et al. |
| 8,065,323 B2 | 11/2011 | Sallakonda et al. |
| 8,069,184 B2 | 11/2011 | Becker et al. |
| 8,078,643 B2 | 12/2011 | Mush et al. |
| 8,122,009 B2 | 2/2012 | Dettinger et al. |
| 8,146,103 B2 | 3/2012 | Schmidt et al. |
| 8,185,508 B2 | 5/2012 | Vemuri et al. |
| 8,191,081 B2 | 5/2012 | Schmidt et al. |
| 8,209,280 B2 | 6/2012 | Kearney et al. |
| 8,214,877 B1 | 7/2012 | Grimes et al. |
| 8,219,919 B2 | 7/2012 | Norring et al. |
| 8,250,094 B2 | 8/2012 | Skaria et al. |
| 8,255,368 B2 | 8/2012 | Cox |
| 8,281,283 B2 | 10/2012 | Speth et al. |
| 8,286,916 B2 | 10/2012 | Pauly et al. |
| 8,327,260 B2 | 12/2012 | Bays et al. |
| 8,347,207 B2 | 1/2013 | Borgsmidt et al. |
| 8,364,300 B2 | 1/2013 | Pouyez et al. |
| 8,364,724 B2 | 1/2013 | Stolte et al. |
| 8,370,400 B2 | 2/2013 | Brunswig et al. |
| 8,375,041 B2 | 2/2013 | Webster et al. |
| 8,386,916 B2 | 2/2013 | LeBrazidec et al. |
| 8,407,215 B2 | 3/2013 | Sheedy et al. |
| 8,407,237 B1 | 3/2013 | Kudryavtsev |
| 8,407,262 B2 | 3/2013 | Hsu et al. |
| 8,407,309 B1 | 3/2013 | Feldman et al. |
| 8,412,673 B2 | 4/2013 | Weissenberger et al. |
| 8,417,732 B2 | 4/2013 | Rapp |
| 8,429,176 B2 | 4/2013 | Sigurbjornsson et al. |
| 8,473,506 B2 | 6/2013 | Sedlar et al. |
| 8,478,515 B1 | 7/2013 | Foucher et al. |
| 8,484,210 B2 | 7/2013 | Loh et al. |
| 8,489,649 B2 | 7/2013 | Yalamanchi et al. |
| 8,504,522 B2 | 8/2013 | Wu et al. |
| 8,504,568 B2 | 8/2013 | Chandrasekhara et al. |
| 8,505,032 B2 | 8/2013 | Craddock et al. |
| 8,510,296 B2 | 8/2013 | Fan et al. |
| 8,515,982 B1 | 8/2013 | Hickman et al. |
| 8,805,875 B1 * | 8/2014 | Bawcom et al. ............. 707/770 |
| 2002/0100014 A1 * | 7/2002 | Iborra et al. ............. 717/104 |
| 2003/0009649 A1 | 1/2003 | Martin et al. |
| 2003/0135850 A1 | 7/2003 | Miloushev et al. |
| 2003/0140036 A1 | 7/2003 | Belowsov |
| 2003/0145255 A1 | 7/2003 | Harty et al. |
| 2004/0122817 A1 | 6/2004 | Kaiser |
| 2004/0153435 A1 | 8/2004 | Gudbjartsson et al. |
| 2005/0004904 A1 | 1/2005 | Kearney et al. |
| 2005/0010565 A1 | 1/2005 | Cushing et al. |
| 2005/0065958 A1 | 3/2005 | Dettinger et al. |
| 2005/0187952 A1 | 8/2005 | Werner |
| 2005/0256889 A1 | 11/2005 | McConnell |
| 2005/0283459 A1 | 12/2005 | MacLennan et al. |
| 2006/0195460 A1 | 8/2006 | Nori et al. |
| 2006/0195476 A1 | 8/2006 | Nori et al. |
| 2006/0224634 A1 | 10/2006 | Hahn et al. |
| 2006/0242104 A1 | 10/2006 | Ellis et al. |
| 2007/0118501 A1 | 5/2007 | Yan |
| 2007/0219976 A1 | 9/2007 | Muralidhar et al. |
| 2008/0065862 A1 | 3/2008 | Hansen et al. |
| 2008/0071799 A1 | 3/2008 | Evans et al. |
| 2008/0091691 A1 | 4/2008 | Tsuji |
| 2008/0120604 A1 | 5/2008 | Morris |
| 2008/0133530 A1 | 6/2008 | Wang et al. |
| 2008/0222159 A1 | 9/2008 | Aranha et al. |
| 2008/0301168 A1 | 12/2008 | Adler et al. |
| 2009/0292730 A1 | 11/2009 | Li et al. |
| 2010/0082646 A1 | 4/2010 | Meek et al. |
| 2010/0114935 A1 | 5/2010 | Polo-Malouvier et al. |
| 2010/0131568 A1 | 5/2010 | Weinberg et al. |
| 2010/0241637 A1 | 9/2010 | Kissner et al. |
| 2010/0318499 A1 | 12/2010 | Arasu et al. |
| 2011/0154226 A1 | 6/2011 | Guertler et al. |
| 2011/0161371 A1 | 6/2011 | Thomson et al. |
| 2011/0225176 A1 | 9/2011 | Siegel et al. |
| 2011/0231454 A1 | 9/2011 | Mack |
| 2011/0238437 A1 | 9/2011 | Zhou et al. |
| 2012/0054142 A1 | 3/2012 | Du et al. |
| 2012/0109661 A1 | 5/2012 | Lueckhoff |
| 2012/0130942 A1 | 5/2012 | Dipper et al. |
| 2012/0131392 A1 | 5/2012 | Bendig |
| 2012/0215768 A1 | 8/2012 | Zellweger |
| 2012/0239987 A1 | 9/2012 | Chow |
| 2013/0110879 A1 | 5/2013 | Winternitz et al. |
| 2013/0111310 A1 | 5/2013 | deOliveira et al. |
| 2013/0117346 A1 | 5/2013 | Figus |
| 2013/0151560 A1 | 6/2013 | Zurek |
| 2013/0159354 A1 | 6/2013 | Heinzl et al. |
| 2013/0166602 A1 | 6/2013 | Brunswig et al. |
| 2013/0246355 A1 | 9/2013 | Nelson et al. |
| 2014/0149180 A1 | 5/2014 | Yaseen et al. |
| 2014/0245079 A1 | 8/2014 | Larson et al. |
| 2014/0258777 A1 | 9/2014 | Cheriton |

OTHER PUBLICATIONS

Graphics: Display Method (SAP-SERM); SAP Library—BC Data Modeler; 2004; pp. 1-5.

AboveSoft Utilities; www.AboveSoft.com; Sep. 2010; pp. 1-6.

Ayers, Lonnie, PMP; SAP BW Data Modeling; SAP-BW Consulting, Inc.; pp. 1-18, printed on Aug. 29, 2013.

Heilman, Rich, HANA Product Management, SAP Labs LLC; Steyn, Werner, Customer Solution Adoption, SAP Labs, LLC; SAP HANA SQL Script Basics & Troubleshooting; Oct. 2012; pp. 1-47.

* cited by examiner

800

```
       810  820                              830
         \   \                                \
constraint [<name>] [on (change | save | validate) [for (insert | update | delete )] ]
               ╭─────[error | warning]
        840    [[if] "{" <expression> "}" | [check <procedureName> ]]
                 \                              \
                 850                            860
```

FIG. 8

ADVANCED DATA MODELS CONTAINING DECLARATIVE AND PROGRAMMATIC CONSTRAINTS

BACKGROUND

Many database structures rely upon Structured Query Language (SQL) as the standard approach to define, read, and manipulate data within a database. The database can include constraints and triggers used to specify rules for data in a database table. A constraint defines properties that data stored in a database must comply with. The constraint can be applied to a column, table, multiple tables, or an entire database schema.

A database trigger is code that is automatically executed in response to an event for the purpose of maintaining the integrity of data on the database. For example, when a new record is added to an employees' table, a new record should also be added in the salaries table for the new employee. The constraints and triggers belong to a Data Manipulation Language (DML) and are used to add data level validation checks (i.e., checks are added to concrete database tables) that are executed when data is modified on a database table. Modification can include executing insert, update, and delete statements.

Violation of a constraint results in reverting the change in the database and writing out a corresponding error message. By definition these constraints and triggers are only applied when data changes in the database table. Thus, there is a need for techniques for expanding the use of constraints and triggers beyond when data is modified within a database table.

SUMMARY

A database language (e.g., Structured Query Language or SQL) is extended to recognize declarative and programmatic constraints that are definable on the data model. In one embodiment, a constraint is defined on a data model. For example, the constraint can be defined on an object, such as an entity, that belongs to the data model. The data model can define the object as a logical grouping of elements from an underlying database. The constraint can be configured to execute a routine to validate an element of the object when a triggering event associated with the object is detected. The constraint can be expressed using expressions from a domain specific language associated with the data model. Alternatively, the constraint logic can be expressed as a stored procedure embedded into the program logic. In one example, the domain-specific language can be the domain definition language (DDL).

A computer compiles the constraint into a runtime artifact associated with the object. The computer can then query the underlying database to form a projection of the object that includes a subset of the plurality of elements. When the triggering event is detected on the projection, the computer executes the runtime artifact. In one example, the triggering event can be an explicit call to the constraint in application logic. In another example, the triggering event can be a system event such as saving, updating, or deleting a view or elements in the projection.

Depending on implementation details, execution of a runtime artifact to validate an element not present in the projection can be handled in a variety of ways. In one example, the missing element can be added into the view. In another example, the entity in its entirety can be loaded into the view. In yet another example, a constraint that relies upon a missing element can be skipped.

The following detailed description and accompanying drawings provide a better understanding of the nature and advantages of the present invention.

BRIEF DESCRIPTION OF THE DRAWINGS

FIG. 8 illustrates the syntax for defining constraints in a data model, according to one embodiment;

DETAILED DESCRIPTION

Figure 1:
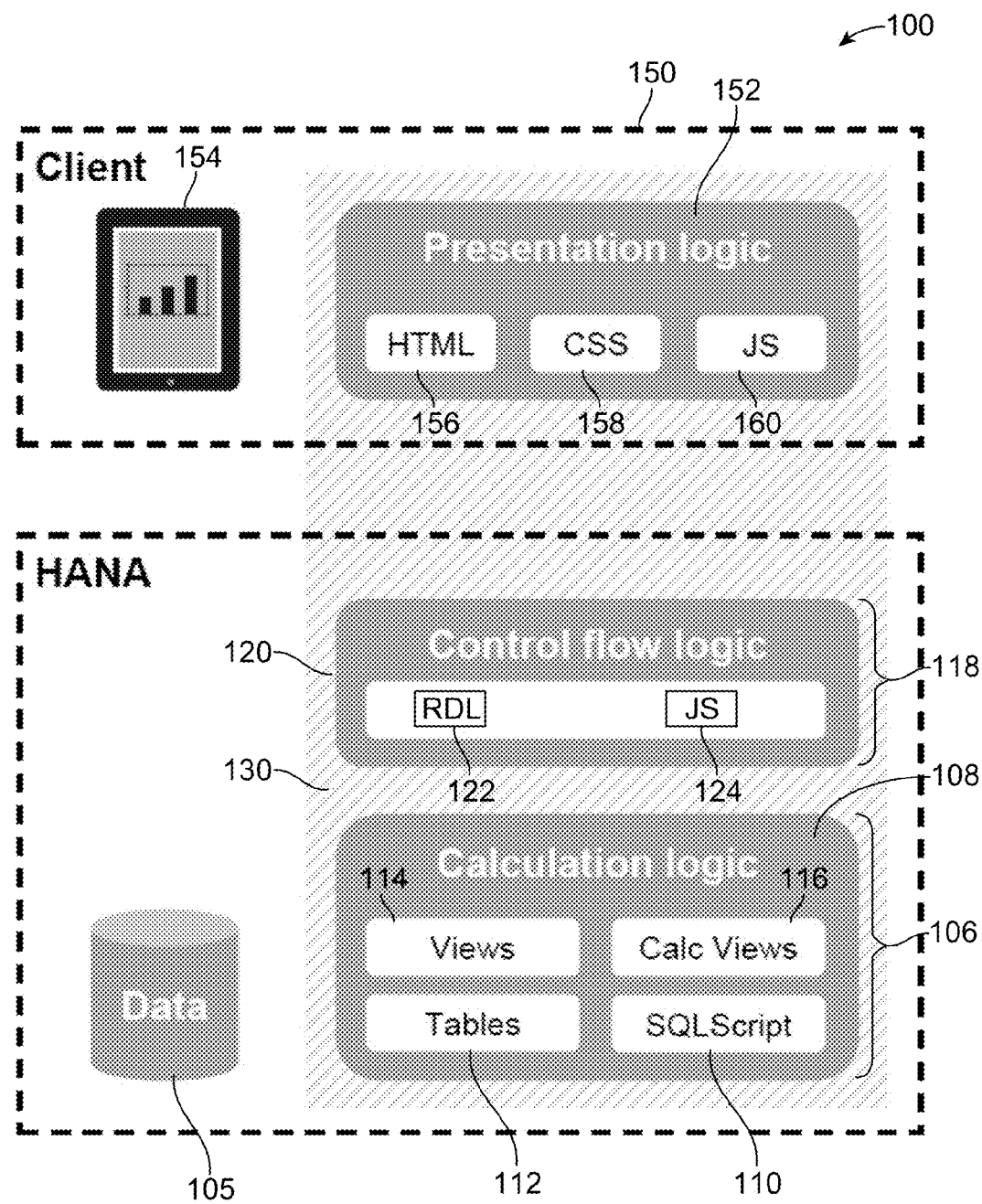
FIG. 1 shows a simplified view of a database system, according to an embodiment.

Described herein are techniques for extending a database language to accommodate constraint definitions on enhanced data models. The defined constraints can be used to validate data in a database. By adding the constraint at a higher level (e.g., the data model rather than the database table), data can be validated without changing the persistency of the database. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein. The first part of the detailed description describes techniques for defining constraints on an extended data model. The second part of the detailed description describes an exemplary extended data model that accommodates entity-relationship models (ERMs).

Defining Constraints on an Extended Data Model

According to embodiments, a database language is extended such that constraints can be defined on the data model. For example, a domain specific language (e.g., Data Design Language (DDL), Query Language (QL), Expression Language (EL), and Programming Language (PL)) in the family of Core Data Services (CDS) can be extended for constraint definitions. By defining constraints on a higher level than the database table, the constraints can be executed not only during system events that are triggered when data is modified (e.g., inserted, updated, or deleted) in the database, but also manually through explicit calls in application logic to the constraint. This can provide upfront data validation that notifies a user of potential violations that may result from modifying the database without committing the changes thereby affecting the persistency of the database. The database language can be extended to include constraint syntax for defining constraints on the data model. The constraint syntax can specify when the constraint is to be validated (i.e., triggering event). For example, the constraint can be set to only validate data being inserted in the database, data being updated in the database, data being deleted from the database, or a combination of the above. In general, defining constraints as part of the data model has the benefit that the constraints are transparently defined and potentially can be evaluated not only by the engines on the backend but also by other engines. For example, a constraint can validate data received from a user interface. The constraint can be explicitly called by application coding of the user interface to check on entered data before the data is inserted into the database.

Examples of different categories of constraints that can be defined on the data model is given below. Typically, a constraint can be defined as part of a data structure that belongs to the data model. Basic and simple constraints are defined as declarative constraints (i.e., constraints that are defined on the data model using expressions of the database language) while complex constraints are defined as programmatic constraints (i.e., constraints that are defined on the data model via coding). The decision regarding whether to define a constraint using expressions of the database language associated with the data model or as a stored procedure written code of the database language can depend on whether the expressions of the database language can easily express the constraint in a manner that is easy for a developer to read and comprehend. Constraints that are not easily expressed using expressions can be coded in a stored procedure.

constraints) or as a stored procedure (e.g., programmatic constraint). While the examples herein discuss defining constraints on an entity of the data model, it is understood by one of ordinary skill in the art that the constraints can also be defined on other database objects of the data model.

FIG. 8 illustrates the syntax for defining constraints in a data model according to one embodiment. Constraint syntax 800 can be defined on an entity of a data model and be invoked automatically by the system as part of a validation process, part of a save process, or manually through explicit calls to the entity. The constraint would be saved as a function of the entity and can be called by an instance of the entity. In one example, a domain specific language such as the data definition language (DDL) can be extended to include constraint syntax 800.

Constraint syntax 800 includes a plurality of fields for defining a constraint to be stored on the entity. In some embodiments, one or more of these fields can be optional. Constraint syntax 800 includes name field 810. Name field 810 can specify the name of the constraint. In one embodiment, the value given to name field 810 can be checked to ensure that the value is unique within the surrounding construct (e.g., entity). In other words, the name of the constraint can be verified as being unique with respect to the elements and actions associated with the entity. If name field 810 is not set, the constraint is an anonymous constraint that cannot be explicitly called.

Constraint syntax 800 further includes on-clause 820. On-clause 820 is configured to define when the constraint is to be applied based on logical events of the database. If on-clause

| Category | Examples |
| --- | --- |
| Basic | NOT NULL |
| | Key fields of entities |
| | SalesOrder → Customer ID must be there |
| | NOT INITIAL (MANDATORY) |
| | Last Change Date must be set (no blank field) |
| Simple | Enum checks (field value part of enum (incl. extensions)) |
| | → Relevance for LLVM/HANA Engine and possible benefits due to compiling → no dictionary lookup |
| | Which ENUMS → stable lists → not too many values |
| Foreign key existence checks (associations? Compositions!) | → Difference between Associations/Compositions → Severity of check |
| | SalesOrder has to have at least one item (associated entity (composition)) → Cardinality check |
| Dependent values or value domains | Amount has to have a currency if the amount value is not initial |
| | Currency to be checked against the allowed currencies (value domain) |
| | Currencies that are set via configuration as allowed currencies |
| | Some product is only allowed to be shipped into defined countries (e.g. guns not into near-east) |
| | salesOrder.Product.allowedShipmentCountries ~= salesOrder.deliverAdress.country |
| Field dependencies (values of one field depend on values of other fields) | German address (country code = DE), the postal code has to be set (NOT INITIAL), for US address (country code = US), the zipcode has to be set (NOT INITIAL) |
| Application Constraints | SalesOrder.Customer has to exist (existence check on customer ID) and customer has to have status "released" |
| | To allow shopping on invoice, a customer has to have at least one other order where he paid |
| | Discount 10% only allowed if order volume >500$ (configurable) and customer has A-Rating, else only 5% discount |

Defining Constraints on an Extended Data Model

A domain-specific language is extended to accommodate the definition of constraints on a database object of the data model. The database object can be an entity or other data structure of the data model. A constraint can be defined using expressions of the domain specific language (e.g., declarative 820 is set to "on validate," the constraint is applied according to programmatic validation checks. Thus, the application logic can explicitly call the constraint to be applied. Alternatively, setting on-clause 820 to "on validate" can result in the constraint being applied as part of a built-in validation function that belongs to the entity. For example, the entity can be validated automatically according to validation logic. When the on-clause of an entity is set to "on validate," the constraint can also be applied during validation of the entity. In some examples, "on validate" can be the default setting if on-clause 820 is not set. If on-clause 820 is set to "on save", the constraint is applied when a save occurs on the entity. In some examples, saving an entity includes validating the entity first and thus, constraints that have been set to "on validate" are also performed along with the constraints that have been set to "on save" when data is saved on the entity. If on-clause 820 is set to "on change," the constraint is validated when data changes are made on the entity. The change can be an insert, update, or delete of data related to the entity.

Constraint syntax 800 further includes for-clause 830. As described above, a constraint can be validated when a change is made to an entity if on-clause 820 is set to "on change." For-clause 830 can further define when the constraint is to be validated by specifying what type of change triggers the constraint. If for-clause 830 is set to "for insert," the constraint is validated when a new record is created. If for-clause 830 is set to "for update," the constraint is validated when a data associated with the entity changes. If for-clause 830 is set to "for delete," the constraint is validated when a record is deleted. This cause can be useful for constraints that validate across multiple entities. For example, the for-clause can be set to "for delete" when the constraint checks if deletion of one record can lead to a violation with another record. For instance, deleting an employee record should also lead to the deletion of a salary record that is associated with the deleted employee.

Constraint syntax 800 further includes output field 840. Output field 840 can specify the severity of the constraint by setting what is output when the constraint is violated. Output field 840 can be set to "error" when violation of the constraint leads to outputting an error message. In one embodiment, the modification that induced the violation can also be reverted to avoid the error in the database. Alternatively, output field 840 can be set to "warning" when violation of the constraint leads to outputting a warning. In one embodiment, modifications that lead to issuing a warning are still committed into the database. Thus, a warning may not revert a modification to the database since the modification is committed.

The validation to be performed when a constraint is triggered can be expressed in a declarative or programmatic manner. Depending on the complexity of the constraint, one manner may be selected over the other. For example, simple constraints can be expressed in a declarative manner since they can be easily written using expressions native to the domain specific language. In contrast, complex constraints are expressed in a programmatic manner since they cannot be easily expressed using expressions native to the domain specific language. Examples of simple constraints (e.g., category simple and basic) and complex constraints (e.g., field dependencies and application constraints) are shown in the table above.

A declarative constraint can be expressed using if-clause 850 of constraint syntax 800. If-clause 850 is configured to store an expression that is validated when the constraint is triggered. The expression can be expressed using expressions native to the domain specific language. In contrast, a programmatic constraint can be expressed using check-clause 860 of constraint syntax 800. Check-clause 860 is configured to store a name of a procedure that is called when the constraint is triggered. The procedure, which is configured to validate one or more elements of the entity, can be written using code and called on by the constraint when the constraint is triggered. Thus, the programmatic constraint is bound to the data model and uses a stored procedure to implement the logic for the constraint validation rather than an expression. In other embodiments, more or fewer fields can define the constraint syntax.

In one embodiment, a shorthand version of constraint syntax is be available to simplify the creation of constraints. A shorthand version of constraint syntax 800 is given below:

constraint [<name>] "{" <expression> "}";

This shorthand version is equal to the constraint below:

constraint [<name>] on validate error if "{" <expression> "}"

An example of constraints defined on an entity is given below. As shown, the entity definition includes five constraints. The first four are declarative constraints expressed using expressions of the domain specific language while the last one is a programmatic constraint that calls procedure "myProcedure." As shown, the constraints do not specify a triggering event and thus are triggered manually using explicit calls to the constraint.

```
entity salesOrder {
    key ID : integer NOT NULL;
    customer : association to customer;
    OrderDate : date;
    createdBy : string;
    lastChangeDate : date;
    amount : amount {
        value : float
        currency : currency
    }
    // Assert: lastChangeDate NOT INITIAL
    constraint ChangeDateMissing error if { this.lastChangeDate = 0 }
    // constraints on amout
    constraint CurrencyMissing
        error if {this.amount.value != 0 and this.amount.currency = '' }
    constraint InvalidCurrency
        error if {this.amount.currency != '' and
        !exists(this.amount.currency) }
    // expressions navigating to associated entities
    constraint InvalidProductCategory error if
{this.item.product.category = 'foo') };
    // code-based constraint via procedure
        constraint complexValidationLogic error check 'myProcedure';
}
```

An example of a stored procedure that is registered with the above procedural constraint "complexValidationLogic" is given below. A stored procedure can receive one or more inputs and output a result. The domain specific language can be extended to include a result type for outputting the result of validating a constraint. As shown, the procedure "myProcedure" receives theRecord salesOrder as an input and outputs a result $salesOrderCheckResult. The constraint can be implemented using coding within the stored procedure.

```
CREATE PROCEDURE myProcedure (
    IN theRecord salesOrder // $this: the entity on which the constraint
    is checked
    OUT result $salesOrderCheckResult )
LANGUAGE SQLSCRIPT READS SQL DATA
{WITH RESULT VIEW <view_name>}}
AS
BEGIN
    [...]   // constraint implementation
END
```

Consuming Constraints Stored on the Extended Data Model

After the constraints are stored on the extended data model, they can be consumed during processing of the database. In one embodiment, programmatic validation invocations can be added to the code of the application logic to explicitly call constraints stored on the data model. In another embodiment, system controlled validations can ensure that data being saved in the database remains consistent to preserve the integrity of the database.

Figure 9A:
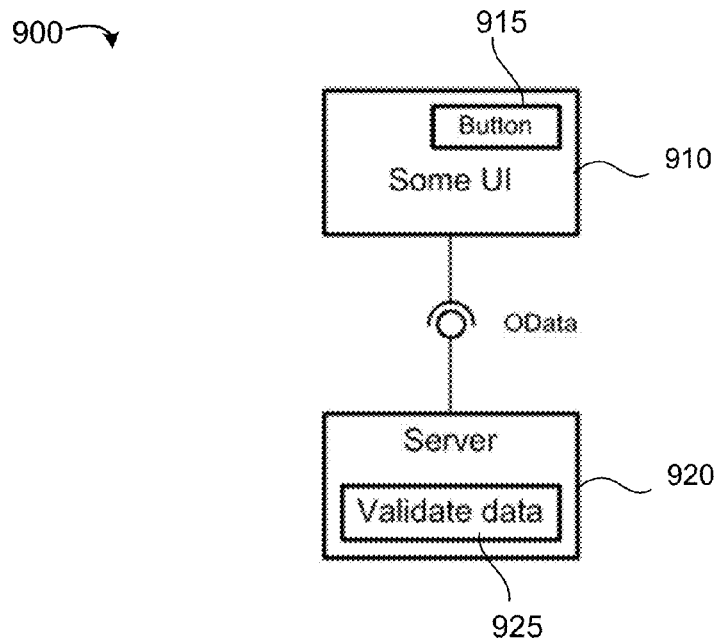
FIG. 9A illustrates a programmatic validation invocation scenario, according to one embodiment.

Programmatic validation invocations include explicitly calling a constraint in the code of the application logic to validate an entity. In one example, a programmatic validation invocation can be performed when creating or changing a record or when one entity calls another entity, particularly when there is encapsulation between the entities. For example, a check function in one entity can result in calling a constraint in another entity. These constraint checks can be performed on the data records without saving the data in the database. Thus, the constraints can serve to verify that modifying the database will not generate constraint violations. FIG. 9A illustrates a programmatic validation invocation scenario according to one embodiment. Scenario 900 includes user interface 910 that includes button 915. A user can enter data in input fields of user interface 910 and select button 915 to check the data for consistency before committing the data into the database. In one example, the entered data can be values for elements of an entity. The entered data is submitted to server 920 as OData and is validated using validation process 925. OData is a web protocol standard providing platform-agnostic interoperability for querying and updating data. OData leverages web technologies such as HTTP, Atom Publishing Protocol (AtomPub), and JSON (JavaScript Object Notation) in order to provide access to information from a variety of applications. The simplicity and extensibility of OData can provide consumers with a predictable interface for querying a variety of data sources. Validation process 925 can include validating the data by calling one or more constraints. In one example, the validation process may not change the persistency of the database. The results of the validation process are presented to the user on user interface 910. Thus, the appropriate warning and error messages can be presented to the user without storing the data on the database.

Figure 9B:
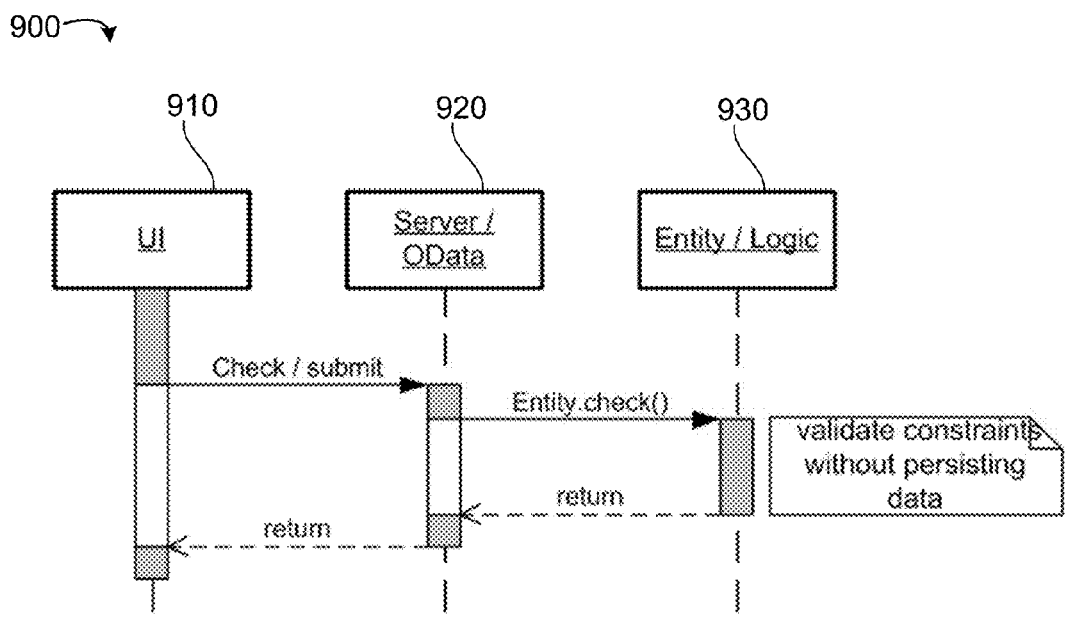
FIG. 9B illustrates a detailed programmatic validation invocation scenario, according to one embodiment.

FIG. 9B illustrates a detailed programmatic validation invocation scenario according to one embodiment. Scenario 900 is a detailed flow diagram of the scenario described in FIG. 9A. As shown, user interface 910 transmits a check/submit request to server 920. The check/submit request includes data entered into the data fields of user interface 910. In response to the request, server 920 calls one or more constraints to validate the entered data. For example, a constraint having a built in function such as check ( ) function can be called to validate the entered data. As another example, a specific stored procedure can be used for validation. An example of a stored procedure is given below.

```
CREATE PROCEDURE <schema>.SalesOrderValidate (
    IN entity SalesOrder
    OUT result <CommonValidationResult> )
    OUT Boolean Boolean// could be used to return if check was ok ...
    could also be error level
LANGUAGE SQLSCRIPT READS SQL DATA
AS
BEGIN
    // the logic of the constraint expressions or calls to the coded
    constraints
    // goes here
END
```

Calling the procedure and manually validating the results can look like:

```
mySalesOrders = ...
CALL SalesOrderValidate( mySalesOrders, result );
If result.length( ) > 0 {
    // there has been some validation issue
}
```

While programmatic validation invocations provide the option for adding explicit checks, system controlled validations can ensure that data saved to the database will not affect the integrity of the database. System controlled validations can be provided to ensure that basic data level constraints and application level constraints are validated before data is modified on the database. In one example, a validation constraint can be explicitly tied to commands on the CDS level such that a constraint is first validated before modifying the database through a SQL level modification statement. In other words, the system controlled validation is performed before modifying the database. In another example, the validation constraint can be explicitly added to a SQL statement associated with a command so that the validation constraint is integrated into the DB/SQL execution on a low level.

In some embodiments, a constraint stored on the data model can be compiled into a runtime artifact. For example, a constraint can be compiled into a runtime artifact that is executable by SAP's HANA engine such as an SQL script. Declarative constraints can be translated into queries and SQL-script procedures that are associated with the entity. A result type can also be generated to output the result from the constraint validation. In one example, the result type can be a container configured to store the records that violate the constraint. In another example, the result type can be an array configured to store points to the records that violate the constraint. Programmatic constraints can also be compiled into runtime artifacts. In some examples, a declarative constraint and a programmatic constraint can exist for the same procedure. In these scenarios, a wrapper procedure can be generated that wraps together both the declarative constraint and the programmatic constraint. This can allow the code for both the programmatic constraint and the declarative constraint to remain stable.

Typically, if a new entity record is being added to the database, all the constraints associated with the entity are validated. However, when modifying the entity only affects a subset of the elements in the entity, all the constraints associated with the entity may not be applicable. For instance, constraints that are associated with non-selected elements may optionally be skipped. In one example, a projection of an entity, which contains a subset of the elements in the entity, can be loaded in a query. Changes to the entity that are based off the query may not require validating a constraint that is associated with an element not loaded in the query. The validation of these partially loaded entities can vary depending on implementation details.

In one embodiment, the compiler can load an element of the entity that is missing in the view so that the constraint can be performed. The loading of an element can be an implicit action taken by the compiler. As such, the developer may not be aware of the loading of an additional element.

In another embodiment, the compiler can omit the execution of a constraint that relies on an element missing in a view. Since the element to be validated is missing in the view, it is presumed that the constraint is not violated and thus does not need to be performed. For example, a constraint that relies upon an element of the entity that is not loaded in a view can be skipped. As another example, a constraint that is based on three related elements where two of the elements are present in the view but one is not can also be skipped. In another example, a constraint that is based on three unrelated elements where two of the elements are present in the view but one is not can be validated since validating the constraint can still validate two of the three elements.

In yet another embodiment, the compiler can load all the elements of an entity into the view when performing a constraint that relies on an element missing in the view. The entire entity is loaded by the compiler so that the constraint can be applied to a view containing all the elements of the entity. This is the best option for ensuring the integrity of the database since the constraint is performed on the entity in its entirety.

Figure 10:
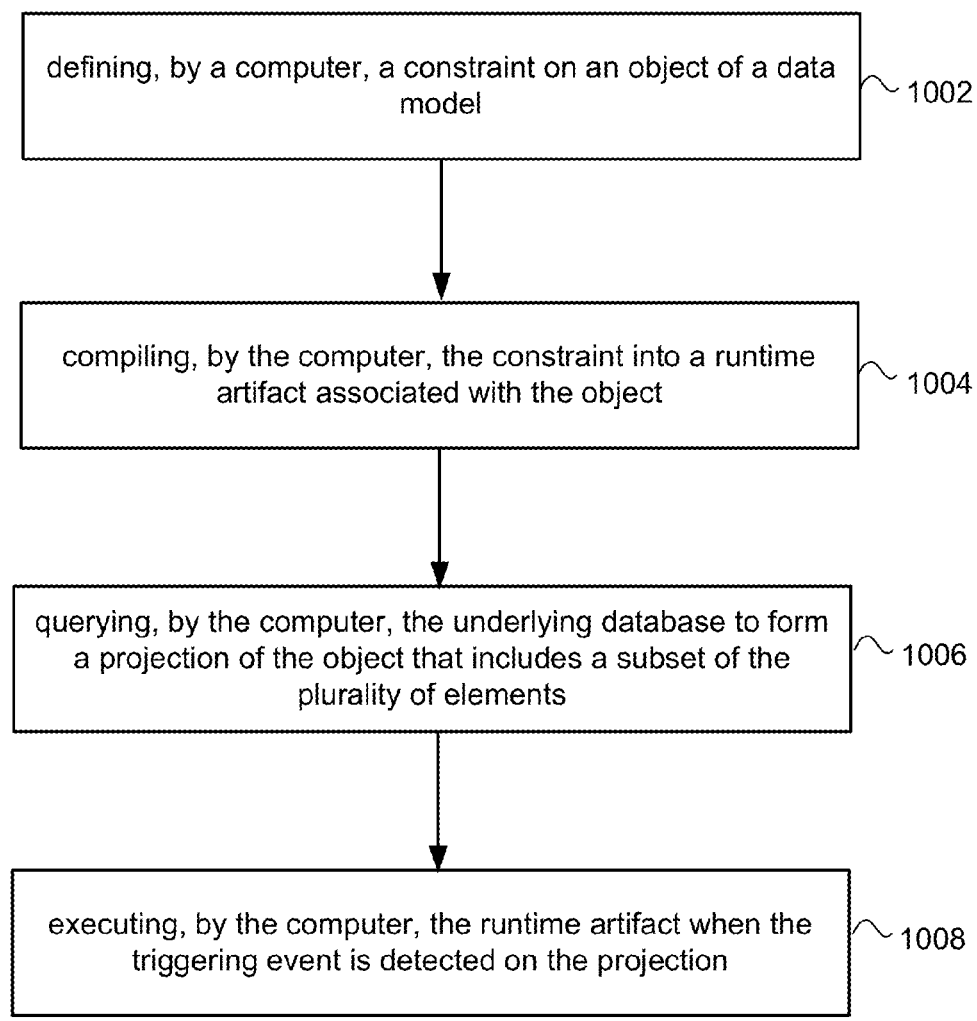
FIG. 10 illustrates a simplified view of a process flow, according to an embodiment.

FIG. 10 illustrates a simplified view of a process flow 1000 according to an embodiment. Process 1000 begins by defining, by a computer, a constraint on an object of a data model at 1002. The data model, which can be an entity-relationship model, is configured to define the object as a logical grouping of elements from an underlying database. The constraint can be configured to execute a routine to validate an element of the object when a triggering event associated with the object is detected. In one example, the data model is specified in a domain-specific language and the routine is expressed using expressions from the domain-specific language. In one example, the triggering event is explicitly calling the constraint. In another example, the triggering event is one of saving, modifying, and deleting the object. In yet another example, the triggering event does not change the persistency of the underlying database. In yet another example, the triggering event is a change to the underlying database. In one example, validating the element includes checking a dependency between the element and another element. The another element can belong to another object of the data model.

Process 1000 then continues by compiling, by the computer, the constraint into a runtime artifact associated with the object at 1004. Once the constraint has been compiled, process 1000 continues by querying, by the computer, the underlying database to form a projection of the object that includes a subset of the plurality of elements at 1006. Process 1000 then continues by executing, by the computer, the runtime artifact when the triggering event is detected on the projection at 1008. Execution of the routine can output an error or warning depending on a setting of the constraint. In one example, executing the runtime artifact includes determining that the element of the object to be validated by the constraint is missing from the projection of the object, loading the element into the projection, and performing the routine on the projection. In another example, executing the runtime artifact includes determining that the element of the object to be validated by the constraint is missing from the projection of the object, loading the object in its entirety into the project, and performing the routine on the projection.

Extended Data Model to Accommodate ERMs

Described herein are techniques for extending a relational model-based database language (e.g., Structured Query Language known as SQL), to accommodate higher level entity-relationship models. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

FIG. 1 shows a simplified view of a database system 100, according to an embodiment. In particular, the database system 100 comprises data 105 of the database itself, organized according to a relational model.

A lower layer 106 of the database system comprises calculation logic 108 that is designed to interact with the data 105 itself. Such calculation logic 108 may be performed by various engines (e.g., SQL engine, calculation engine, SQL script) in order to provide basic data definition and processing based on the relational model. Such basic data definition can include defining of data types making up the database, associated metadata, and the database structure (e.g. columns, tables). The lower layer 106 of the database system may include SQL script 110, as well as data structures such as tables 112, views 114, and calculation views 116.

The embodiment presented in FIG. 1 shows HANA, the in-memory database available from SAP AG of Walldorf, Germany, implemented as the database. However, embodiments are not limited to use with this particular database. Examples of other in-memory databases include, but are not limited to, the SYBASE IQ database also available from SAP AG; the Microsoft Embedded SQL for C (ESQL/C) database available from Microsoft Corp. of Redmond, Wash.; the Exalytics In-Memory database available from Oracle Corp. of Redwood Shores, Calif., etc.

Further, while the embodiment presented in FIG. 1 shows the database as comprising an in-memory database, various embodiments could be employed in conjunction with conventional disk-based database systems.

An application layer 118, overlying the calculation logic 108 of the database system 100 comprises control flow logic 120. The control flow logic 120 may be implemented utilizing River Definition Language (RDL) 122 and JavaScript (JS) 124 to reference model concepts such as entities and relationships that are not reflected in basic SQL. This control flow logic 120 may further comprise common languages for defining and consuming data across different containers (e.g. native, ABAP, Java).

As shown in FIG. 1, in order to facilitate the sharing of information across such different containers and thereby promote a more unified environment, the database system 100 may further comprise a Core Data Services (CDS) component 130. CDS component 130 comprises a common set of domain-specific languages (DSL) and services. The CDS component 130 may allow defining and consuming semantically rich data models as an integral part of the database structure, thereby permitting data modeling as well as the retrieval and processing of data to be raised to a higher semantic level that is closer to the conceptual thinking of domain experts. The role of the CDS component 130 is discussed in detail further below.

FIG. 1 further shows client 150 in communication with the HANA in-memory database appliance available from SAP AG. The client 150 includes presentation logic 152 to provide an output 154 comprising data 105 of the underlying database structure in a form desired by a user. Here, the output 154 is shown as a vertical bar chart, but of course this represents only one of a multitude of different ways in which the data may be communicated to a user. The presentation logic 152 may communicate such output in the form of HTML 156, cascading style sheets (CSS) 158, and/or JavaScript 160, or a variety of other user interface technologies.

Figure 2:
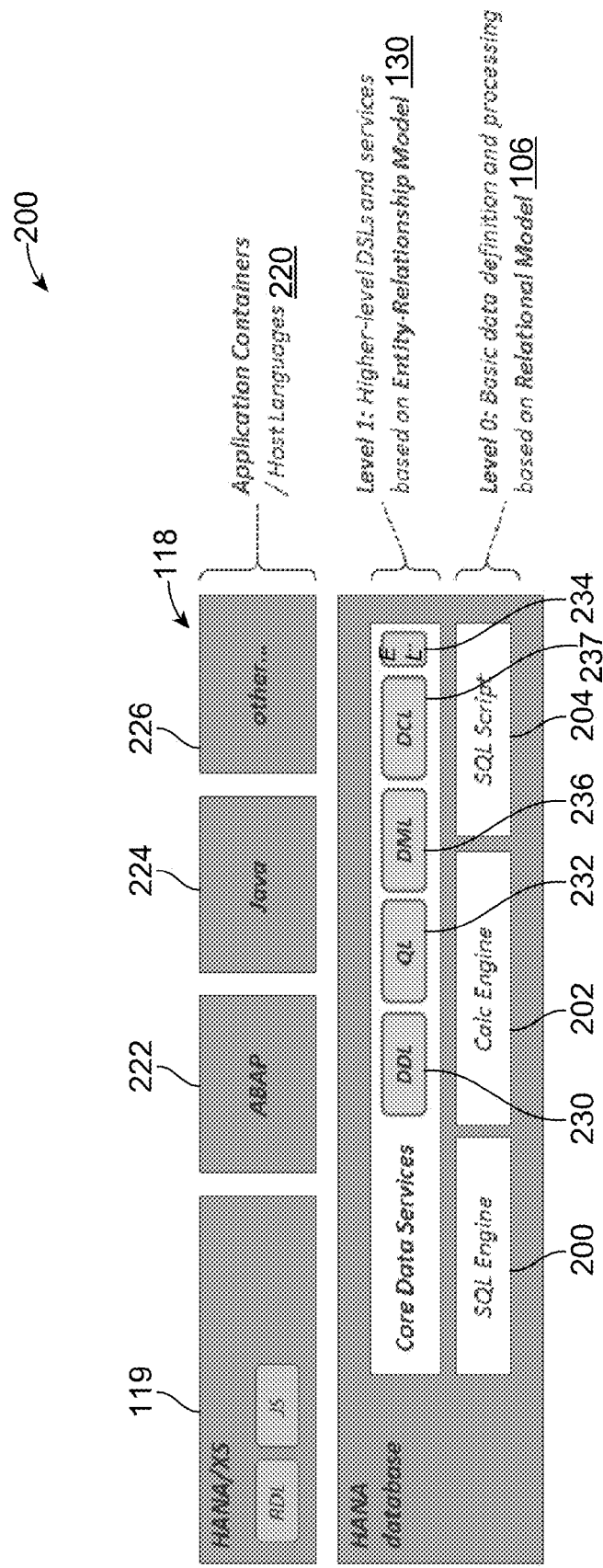
FIG. 2 shows an enlarged view of the database structure of FIG. 1.

FIG. 2 shows an enlarged view of the HANA in-memory database structure of FIG. 1. In particular, FIG. 2 shows SQL engine 200, calculation engine 202, and SQL script 204, as part of the lower layer 106 that performs basic data definition and processing based upon the relational model, according to which the data 105 of the database is organized. FIG. 2 also shows the application layer 118 of the database structure of FIG. 1, including the RDL and JS elements of a query engine 119. The application layer 118 further comprises application containers and other host languages 220, including ABAP 222, Java 224, and others 226.

FIG. 2 further shows the CDS component 130 situated between the lower layer 106 and the application layer 118. As illustrated in this figure, the CDS component 130 can be leveraged in any consuming stack variant (stack of software layers located on top of each other), as implemented through the application layer 118. Specifically, services in higher layers can use/consume the services of lower layers. Here, because the application layer sits on top of a data layer in which the CDS component 130 resides, definition and consumption of the semantically rich higher-level models is allowed.

In particular, the CDS component 130 implements higher-level Domain Specific Languages (DSLs) and services based on an entity-relationship model (ERM). The Data Definition Language (DDL) 230 is used for defining semantically rich data models, including the data types, associated metadata, and database organization (e.g., columns and tables). As mentioned throughout, according to embodiments, the DDL may be extended to further enrich these data models through the use of entities and annotations.

The Query Language (QL) 232 is used to conveniently and efficiently read data based on data models. It is also used to define views within data models. The role of the QL 232 and its relation to the DDL 230 is further illustrated in connection with FIG. 3.

The Expression Language (EL) 234 is used to specify calculated fields, default values, constraints, etc., within queries. Calculated fields, default values, and constraints may be specified as well as for elements in data models.

Other elements of the CDS component 130 can include Data Manipulation Language (DML) 236 and a Data Control Language (DCL) 237, both of which may be used to control access to data.

Figure 3:
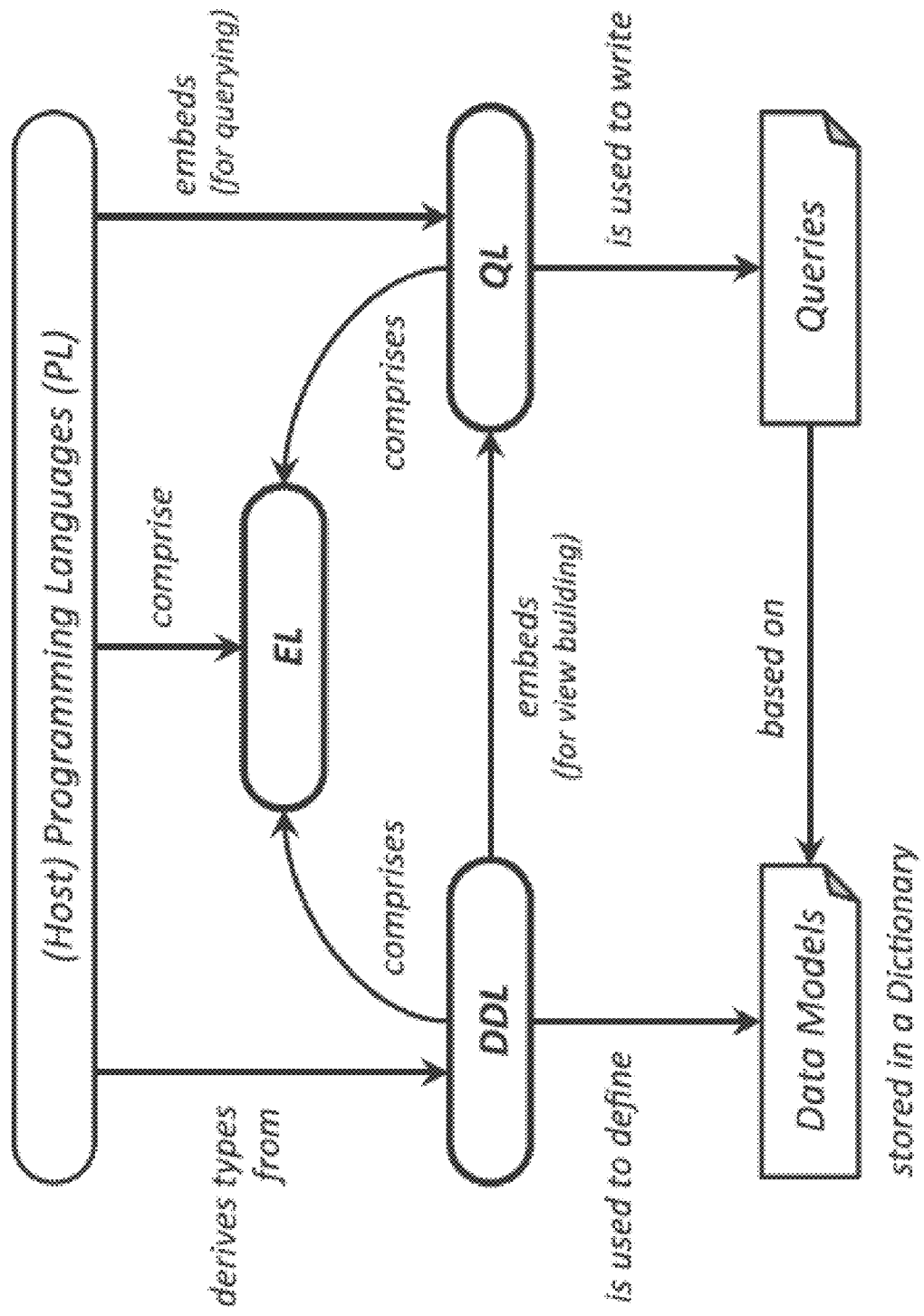
FIG. 3 illustrates relationships between individual languages making up a language family useful for interacting with a database.

Embodiments as described herein may distinguish between the domain-specific languages DDL, QL, and EL as members of a language family. This approach fosters considerations such as modular design, incremental implementation, and reuse. FIG. 3 is a simplified view illustrating relationships between these language family members. A consistent language experience across the members of the family of FIG. 3 can be achieved by ensuring the languages follow a common style. This can extend to the host programming language, with expressions in DDL, QL, and EL code adopting the same syntax. Utilization of application level domain language(s) as has been described above, can offer certain benefits. One possible benefit is that the application domain level language can avoid the use of "inefficient" and error-prone code.

Take, for example, the following simple data model describing employee information:

```
entity Employee {
    name : String(77);
    salary : Amount;    // a structured type
    orgunit : Association to OrgUnit;
    addresses : Association to Address[0..*] via entity
```

```
    Employee2Address;
    homeAddress = addresses[kind=home];    // introduced later on
}
entity OrgUnit {
    name : String(111);
    costcenter : String(44);
    manager: Association to Employee;
    parent: Association to OrgUnit;
}
entity Address {
    key streetAddress; key zipCode; city;    // omitted type defs
    kind : enum { home; business; }
}
```

Under some circumstances, it may be desired to write a query statement as follows: SELECT id, name, homeAddress.zipCode FROM Employee WHERE . . .

Within that sample snippet, path expressions along relationships are used to fetch data from an associated entity. In the simple data model above, the above query statement is equivalent to the following standard SQL statement:

```
SELECT e.id, e.name, a.zipCode FROM Employee e
LEFT OUTER JOIN Employee2Address e2a ON e2a.employee = e.id
LEFT OUTER JOIN Address a ON e2a.address = a.id AND
a.type='homeAddr'
WHERE ...
```

This statement, however, may already be too complex for many application developers. Thus, code patterns similar to that given below, may be used in some pseudo languages:

```
customers = SELECT * FROM Customer
foreach c in customers do
    write c.id
    write c.name
    addresses = SELECT * FROM Address a, $Customer2Address c2a
        WHERE a.id = c2a.address AND c2a.customer = :c.id
    foreach a in addresses do
        if a.type = 'homeAddr' then write a.zipCode
    end
end
```

There are several issues with the code presented immediately above. One issue is the use of an imperative coding style with loops in loops, resulting in 1+n queries being executed or too much data being fetched with a SELECT * statement.

The above code represents only a relatively simple case. A more complex case is found in the following example:

```
SELECT FROM OrgUnit[boardarea= 'TIP']
    .employees[salary>'$100,000'] {
        addresses[kind=home].city, count(*)
    }
```

The preceding cases illustrate the importance of increasing expressiveness of the languages used in application development (here, the query language). This allows the intent of application developers to be captured, rather than being buried under substantial volumes of imperative boilerplate coding.

Such expressiveness is in turn is fundamental to having optimizations applied by the query engine (in a manner analogous to functional programming vs. imperative programming). This can affect system characteristics, such as its overall performance and scalability. Further, a language's ability to allow developers to draft concise and comprehensive code, can increase developer productivity. It can also reduce the risk of mistakes and also enhance readability, and thus increase the maintainability of the code.

In order to write concise and readable query statements, it is desirable to enrich the data definitions with sufficient metadata (e.g., about associations, semantic types, etc.). Accordingly, embodiments seek to extend the DDL to define data definitions with sufficient metadata, and seek to extend the QL to leverage such definitions.

DDL and QL are declarative, domain-specific languages providing developers with concise ways to express their models and queries. Certain concepts may originate from entity-relationship modeling (ERM). By adding native support for such concepts in the underlying engine of the database, embodiments avoid the impedance mismatch induced by the translation of conceptual models based on ERM into implementations based upon a plain relational model. In particular, writing concise and comprehensive code reduces risks of mistakes and increases readability and maintainability.

Moreover, as the concepts of entity-relationship models may lie at the core of many higher-level models, embodiments are able to capture the semantics of other data models (e.g., RDL-based data models), and share those semantics with database modelers, and/or ABAP of SAP AG, or Java consumers. This reduces fragmentation and the loss of semantics. In addition, since ERM is also the chosen basis for technologies like OData EDM, embodiments can facilitate mapping entities and views to OData entity sets.

Embodiments may employ a functional approach that is based on standard SQL. In particular, the comprehensive, domain-specific nature of DDL and QL allows capturing the intent of application developers, thus avoiding a lack of clarity regarding that intent which can result from large volumes of imperative boilerplate coding. This follows the principles of functional programming and is important for optimizations.

The functional approach may be inherited from SQL. A SQL SELECT statement declares which sub-set of an overall data model is of interest as projections and selections. It may be left to the query engine to determine optimal execution, including parallelizing as appropriate.

In contrast with imperative object traversion patterns, embodiments can speed up many data retrieval use cases. While many of those retrieval cases are not individually expensive, the cumulative impact of this streamlining can have significant impacts on scalability, as it affects all requests over long periods of time.

Embodiments address some of the complexity offered by standard SQL to typical application developers by raising the basis of SQL from plain relational models to the level of conceptual models. This is done by providing native support for ERM in the database system. In this manner, the use of SQL may be reestablished for most application developers, not only for those with the SQL expertise for specific optimization tasks.

Embodiments employ associations in DDL. Specifically, the DDL allows definition of data models as entity-relationship models on a semantically rich level that is close to actual conceptual thought. To achieve this over the conventional relational model of standard SQL, certain concepts are captured by the embodiments described herein.

Figure 4:
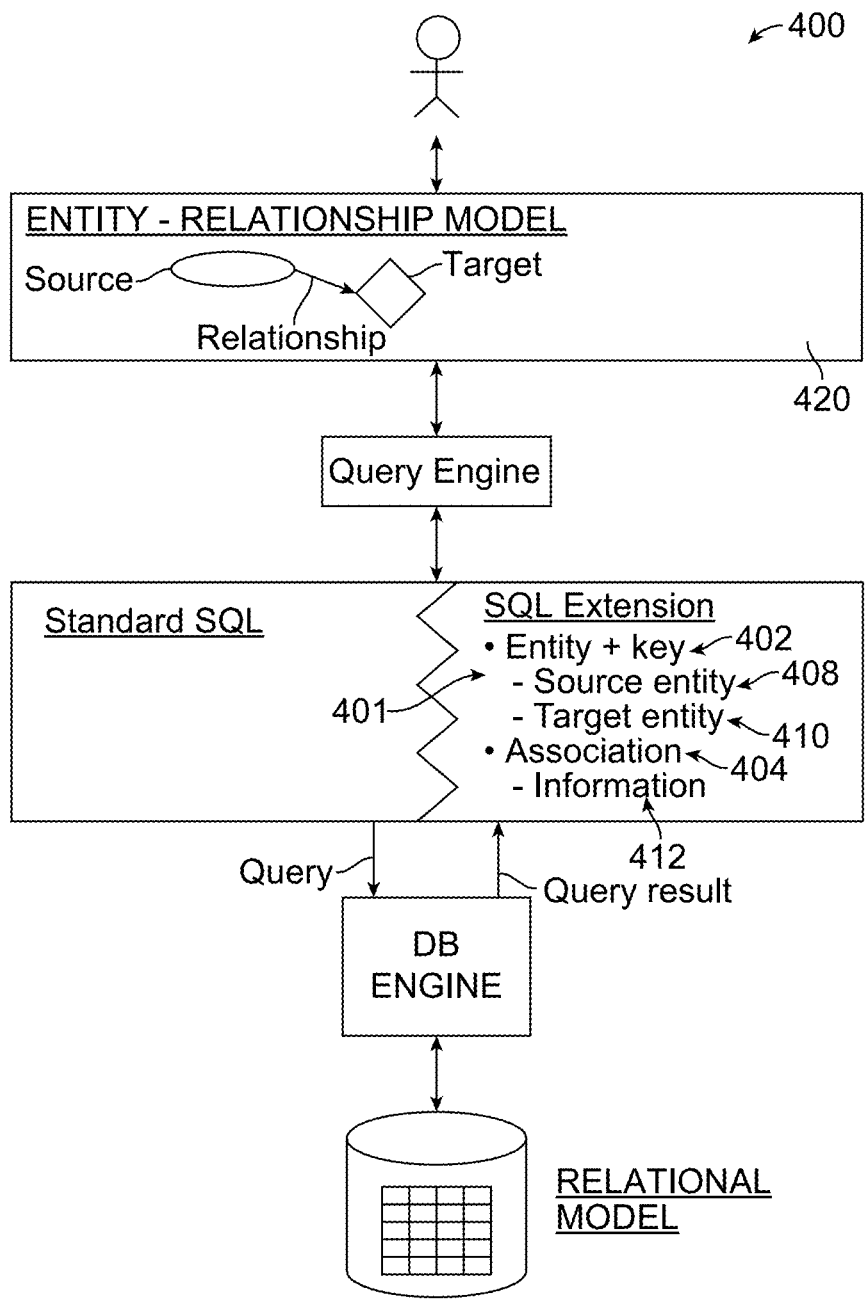
FIG. 4 is a simplified view showing an approach for extending SQL, according to embodiments.

FIG. 4 is a simplified view showing an approach for extending SQL according to embodiments. As shown in the system 400 of FIG. 4, one concept underlying embodiments as described herein, is the use of entities 401 with structured types, in contrast with a conventional relational database which uses only flat tables. Entities are structured types with an underlying persistency and a unique key 402. Structured types are records of named and typed elements. An entity key is formed of a subset of the elements of the entity that uniquely identify instances. Views are entities defined by a query, which essentially defines a projection on underlying entities.

Another concept underlying entities as described herein, involves employing associations 404 on a conceptual level. This approach contrasts with the conventional use of hand-managed foreign keys. Associations define relationships between entities, and are specified by adding an element with an association type to a source entity 408 that points to a target entity 410. As shown in the FIG. 4, the relationship implemented by the association type, between source entity type and the target entity type, reflects the actual relationship between entities in the overlying ERM model 420. Using the type definition, associations may capture metadata about relationships present in the ERM in a 'reflectable' way. According to such a reflectable characteristic, a consuming portion of code receiving a piece of data from the database can get back to the type information (i.e., metadata) provided for the respective elements in the data model.

The association may be complemented by optional further information (e.g., regarding cardinality, which keys to use, additional filter conditions, etc.) up to a complete JOIN condition. According to embodiments, the clause-based syntax style of standard SQL may be adopted for specifying the various parameters without sacrificing readability.

In addition, the extended DDL works with custom-defined Types instead of being limited to primitive types only. The extended DDL may also add other enhancements, such as annotations, to enrich the data models with additional metadata, constraints, or calculated fields.

Figure 5:
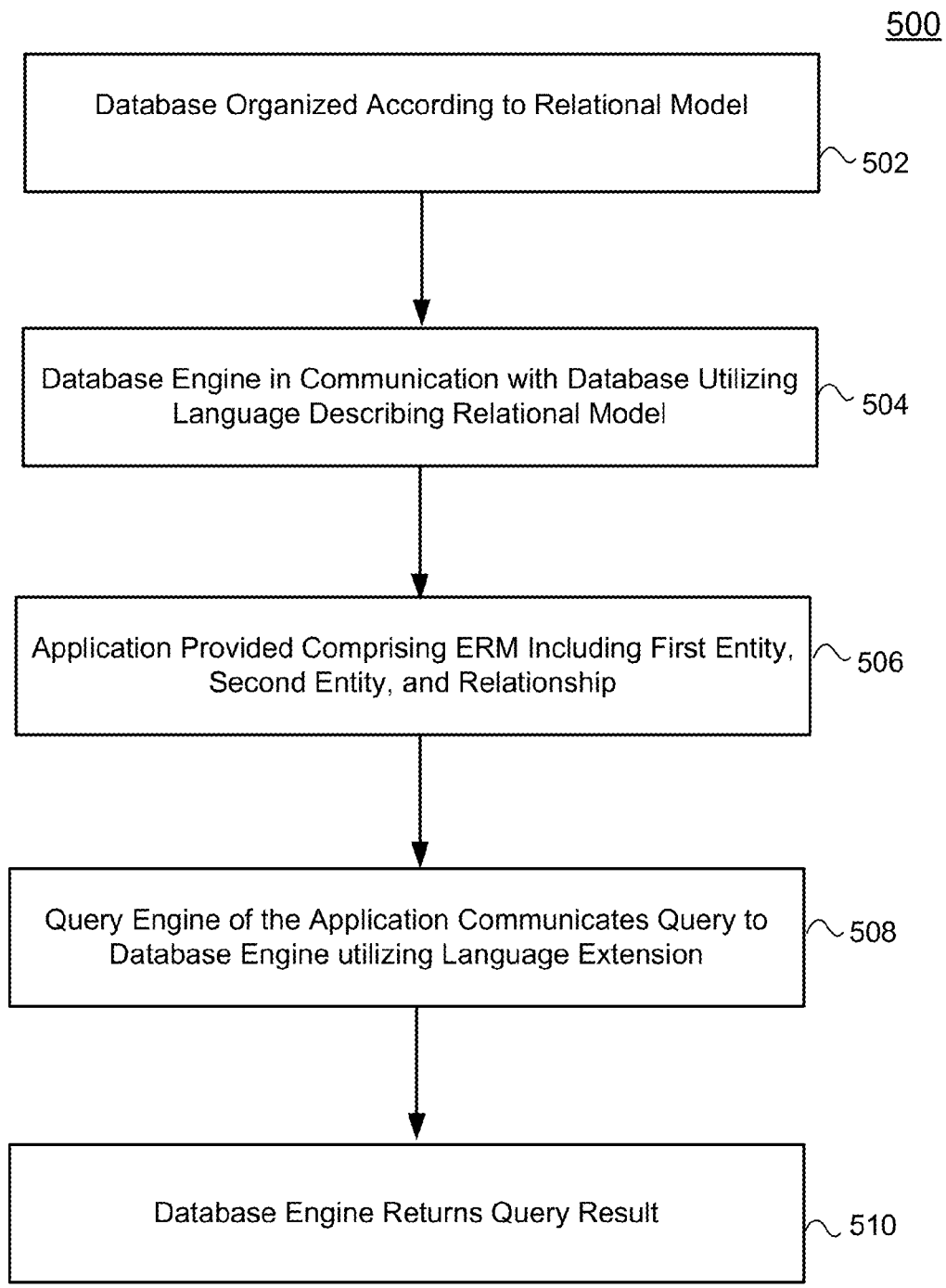
FIG. 5 is a simplified diagram illustrating a process flow, according to an embodiment.

FIG. 5 is a simplified diagram illustrating a process flow 500 according to an embodiment. In a first step 502, a database is provided comprising data organized according to a relational model.

In a second step 504, a database engine is provided in communication with a database utilizing a language describing the relational model. In a third step 506, an application is provided comprising an entity-relationship model (ERM) including a first entity, a second entity, and a relationship between the first entity and the second entity.

In a fourth step 508, a query engine of the application communicates a query to the database engine utilizing a language extension providing the entity and relationship components of the ERM. The language extension may comprise a first structured entity type including a first key and indicating the first entity, a second structured entity type including a second key and indicating the second entity, and a third structured association type reflecting the relationship. The association type may be complemented with further additional information.

In a fifth step 510, the database engine returns a query result to the query engine based upon the language extension.

EXAMPLES

Some examples of extension of the SQL database language to provide entities and associations of ERMs, are now given below.

```
entity Address {
   owner : Association to Employee;   // can be used for :m associations
   streetAddress; zipCode; city;      // snipped type defs
   kind : enum { home, business };
}
entity Employee {
   addresses : Association[0..*] to Address via backlink owner;
   homeAddress = addresses[kind=home]; // → using XPath-like filter.
}
Association to Address;
Association to Address { zipCode, streetAddress };
Association [0..*] to Address via backlink owner;
Association [0..1] to Address via backlink owner where kind=home;
Association [0..*] to Address via backlink owner where zipCode like '76*';
Association [0..*] to Address via entity Emp2Adr;
Association [0..1] to Address via entity Emp2Adr where kind=home;
Association [0..*] to Address on owner=this;
Association [0..*] to Address on Address.owner._id = Employee._id;
Association to Address on owner=this AND kind=home;
```

For specifying syntax, embodiments may use a derivate of the Backus Naur Form (BNF) family of metasyntax notations used to express a context-free grammar, and which can be relied upon to make a formal description of a computer language. The basic constructs may be summarized as follows:

| Construct | Notation | Comments |
|---|---|---|
| definition | = | Definitions are written with a single equals sign, e.g. Rule = ... |
| extension | += | Extends a definition introduced before by additional rules |
| terminal symbol | keyword | Language keywords are set in bold red |
| terminal character | "." | Single-character language symbols are set in double quotes |
| alternation | ... \| ... | Pipe symbols separate alternatives, e.g. foo and bar \| zoo w/ car |
| grouping | ( ... ) | Parenthesis group constructs, e.g. (foo \|bar) with car |
| option | [ ... ] | Square brackets designate optional constructs, e.g. [optional] |
| repetition | ...* | 0+ repetitions are indicated by appended "*", e.g. zeroOrMore* |
| repetition | ...+ | 1+ repetitions are indicated by appended "+", e.g. oneOrMore+ |
| comment | -- ... | Comments start with a double-dash, e.g. -- this is a comment |

Syntax for SQL extended to include entities and associations as described herein, may be described as follows:

```
AssignedType += | AssociationType
AssociationType = Association [ cardinality ] ( to targetEntity ) [
   managedJoin | unmanagedJoin ]
cardinality = "[" [( maxs |* ) "," ] [ min .. ] ( max|* ) "]" | "[ ]"
targetEntity = QualifiedName
managedJoin = ( forwardLink | backwardLink | mediatedLink ) [ where
   filterClause ]
   forwardLink = "{" foreignKeys "}"
   backwardLink = via backlink reverseKeys
   mediatedLink = via entity entityName
   foreignKeys = targetKeyElement [ AS alias ] [ "," foreignKeys ]
   reverseKeys = targetKeyElement           [ "," reverseKeys ]
   targetKeyElement = elementName ( "," elementName )*
unmanagedJoin = on filterClause
```

From DDL perspective, association is a new primitive type that is specified with the type name Association, followed by several parameter clauses to specify requisite metadata. These parameter clauses are as follows:

Cardinality allows specifying the relationship's cardinality in the form of [min .. max], with max=*denoting infinity and "[ ]" as a shorthand for [0.. *]. As a default, if omitted [0..1] is used as the default cardinality. An example is:

Association[ ] to Address via backLink owner;

To targetEntity specifies the association's target entity. A qualified name is expected, referring to another entity (incl. views). Specifying the target is mandatory—there is no default.

{foreignKeys} allows specifying a combination of alternative key elements in the target entity, to be used to establish the foreign key relationship. Where a key element is in a substructure on the target side, an alias name is to be specified. Further details are provided below regarding associations represented as foreign key relationships.

If omitted, the target entity's designated primary key elements are used. The following are examples:

```
Association to Address { zipCode, streetAddress };
Association to Address { some.nested.key AS snk };
```

Another parameter clause is VIA backlink: reverseKeys. For 1:m associations, it is mandatory to specify target elements, which are expected to be a key combination matching the source's primary keys or an association referring to the source entity. An example is:

Association to Address via backLink owner;

Another parameter clause is VIA entity: entityName. For m:m associations, it is mandatory to specify a link table's entity name. That name can either refer to a defined entity or a new entity will be created as follows:

```
entity <entityName> {
   <nameOfSourceEntity> : Association to <SourceEntity>;
   <nameOfTargetEntity> : Association to <TargetEntity>;
}
```

If the data model contains an explicit definition of the link table entity, that entity must adhere to the template shown above. It can, in addition, add other elements. An example is given below:

```
Association to Address via entity Employee2Address;
entity Employee2Address {
   employee : Association to Employee;
   address : Association to Address;
}
```

The WHERE filterClause allows specifying additional filter conditions that are to be combined with the JOIN conditions. This can be especially relevant in combination with VIA backlink or entity clauses. Depending on the filterCondition this can reduce a base :m relationship to one with a:1 cardinality. An example is given below:

Association to Address[0..1] via backLink owner where kind=home;

The ON filterClause allows fully specifying an arbitrary join condition, which can be any standard SQL filter expression. Using this option results in the respective association being user-managed. That is, no foreign key elements/fields are created automatically. The developer is expected to explicitly manage the foreign key elements, including filling them with appropriate foreign key values in write scenarios. An example is given below:

Association to Address on owner=this;

Element names showing up in VIA, WHERE, and ON clauses, are resolved within the scope of the target entity's type structure. Siblings can be referred to by prefixing an element with ".". Elements from the scope above can be referred to by prefixing an element with ". . . ", etc.

In addition, the outer entity's top-level scope can be referred through the pseudo variable "this", which is described further below in connection with Pseudo Variables in QL.

According to embodiments, associations are represented as foreign key relationships. In the relational model, associations are mapped to foreign key relationships. The foreign key elements are usually created automatically as described in the following sections. In particular, an element with association type is represented as a nested structure type containing foreign key elements corresponding to the target entity's primary key elements—i.e. having the same names and types. The following are examples of definitions which may be given:

```
entity Employee { ...
address1      : Association to Address;
address2      : Association to Address { zipCode, streetAddress };
addresses     : Association to Address[0..*] via backlink owner;
}
```

In this example, the association elements would implicitly be defined with a nested structure type containing foreign key elements in the :1 cases (plus additional metadata about the association) as follows:

```
    entity Employee { ...
address1 {
    _ID                 : type of Address._ID;
}
    address2 {
    zipCode             : type of Address.zipCode;
    streetAddress       : type of Address.streetAddress;
    }
    addresses { /* none at all since :m */ }
}
```

Following the rules for mapping structured types to the relational model as specified above, the underlying table would be created:

```
CREATE TABLE Employee ( ...
"address1._ID" Integer,
"address2.zipCode" String(...),
"address2.streedAddress" String (...)
)
```

Rules for representing associations in the persistence model may apply, as indicated in the table below:

| If . . . is specified | for to-one cases, e.g. [0 . . . 1] | for to-many cases |
|---|---|---|
| <no join clause> | Nested foreign key elements are created for target's primary key elements. | not allowed |
| { foreignKeys } | Nested foreign key elements are created for the elements specified in foreignKeys. | |
| VIA backlink reverseKeys | No nested foreign keys are created; instead the reverseKeys are expected to link back from target to source. | |
| VIA entity entityName | No nested foreign keys are created; instead the link table named entityName is created/used as described above. | |
| ON joinCondition | No nested foreign key elements are created; managing the foreign key relationship is completely up to the developer. | |

Consistent with the approach in SQL, no plausibility checks are enforced (e.g., checking whether target key elements specified in {foreignKeys} fulfill the uniqueness requirements). Also, no implicit referential integrity checks are enforced at runtime.

According to embodiments, associations may be in custom-defined types. As associations are special types, they can principally be defined not only for elements in entity definitions, but in type definitions in general. For example, the following definition of the association Amount.currency is valid DDL content:

```
entity Currency {           // List of pre-defined Currencies
key code : String(3);
description : String(33);
}
type Amount {
value : Decimal(10,2);
currency : Association to Currency;
}
```

An actual relationship between entities is established when using the type Amount for an element within an entity definition, as in:

```
entity Employee {
    salary : Amount;
    address : Association to Address;
}
```

The code shown above essentially indicates that the entity Employee has two associations—one association is to Address and another association is to Currency within its salary element.

Associations in custom-defined types may only be supported for a simple "to-one" relationship with a foreign key on the source side. That is, associations with via backlink or via entity clauses may not be supported for elements in custom-defined types.

Associations in Query Language (QL) are now discussed.

Querying Associations with :m Cardinality

Resolving associations or compositions with 1:m cardinality using path expressions or nested projection clauses with the flattening operator "." in place results in flat result sets with duplicate entries for the 1: side, which is in line with standard SQL JOINs and the relational model.

As examples, in the following queries, "addresses" refers to an association with "to-many" cardinality [0..*]:

```
SELECT name, addresses.city FROM Employee;
SELECT name, addresses.{ zipCode, city } FROM Employee;
```

The result sets for the example queries above, are shown below, each with the same value for name repeated/duplicated for each found entry on the :m Address side:

```
<Result Set 1> { name, city }
<Result Set 2> { name, zipCode, city }
```

Embodiments also allow the return of 'Deep' Result Sets. Specifically, in addition to the standard flattening behavior, the introduction of nested projection clauses and structured result sets principally allows expression of 'deep' queries along :m associations. These deep queries return 'real deep' result sets having the l: sides elements on a top level, with nested tables/sets for the :m sides.

For example, the deep query:
SELECT name, addresses {zipCode, city} FROM Employee;
would be expected to return a result set with a nested collection as shown below:

```
<Result Set> {
    name,
    addresses : <collection of> Address { zipCode, city }
}
```

Such deep querying may provide certain benefits. One possible benefit is to allow retrieving larger structures through a single query.

Currently, in the absence of deep querying, such larger structures may frequently be obtained in a brute-force approach, through 1+n queries with n being the number of records returned by a 1: side query. This is detrimental to performance, particularly if such a query spans several levels of to-many associations.

While the other extensions can be realized by translating to standard SQL queries, this one requires adding special support deep within the query engine. The absence of such support may preclude using to-many associations in the non-flattened way. This is discussed further below in the associations of FROM clauses, regarding how association trees can be traversed.

Associations in WHERE Clauses

Associations can arise not only in projection clauses but also in filter conditions in WHERE clauses. Respective comparison operators may be enhanced to support associations, as depicted in the following examples:

```
1. SELECT ... from Emloyee WHERE orgunit={ _id: '4711' };
2. SELECT ... from Emloyee WHERE homeAddress={
  zipCode: '76149', streetAddress: 'Vermontring 2'
};
3. SELECT ... from Emloyee WHERE orgunit='4711';
4. SELECT ... from Emloyee WHERE homeAddress.city like 'Wall%';
5. SELECT ... from Emloyee WHERE homeAddress.city IN ( 'Walldorf', ...);
6. SELECT ... from Emloyee WHERE address IS NULL;
7. SELECT ... from Emloyee WHERE address[kind=home].city = 'Walldorf';
8. SELECT ... from Emloyee WHERE homeAddress = addresses[kind=home];
```

Several issues arising within the examples immediately above, may be worthy of note. In connection with:

ad 1,2: A record literal can be passed to a comparison with an association, with elements that match the combination of the foreign keys.

ad 3: Support for Association type in QL includes automatic coercions of typed scalars or string representations thereof to single-key associations.

ad 4: One can also refer to the individual key values using standard path expressions.

ad 5ff: Other SQL comparison operators can be used, such as LIKE, IN, IS NULL, . . .

ad 8: It can be combined with XPath-like filter expressions.

ad 9: It can be combined with compare associations, provided they are assignable.

The above provides just a few examples to give the idea. In general, every condition that is possible with standard SQL expressions shall be possible to do with associations as well, including sub queries with exists and not exists, etc.

Associations in FROM Clauses

Embodiments may also allow associations in FROM clauses. Specifically, host languages may provide support for representing associations as typed variables or elements. This is described below in connection with association types in host languages.

Accordingly, one can traverse along associations, as shown in the following examples (in some pseudo language):

```
var daniel = SELECT name, homeAddress FROM Employee WHERE name='Daniel';
// ... and somewhat later, maybe at some other place in an application...
var addresses = SELECT * FROM Address WHERE this=daniel.homeAddress;
```

The expression this=<an association> can be used. The comparison this=<an association> can be retrieve an entity by a given association. The pseudo variable this is always an alias for the entity given in the FROM clause. Therefore, the statement above actually resolves to:

SELECT * FROM Address this WHERE this=daniel.homeAddress;

The comparison this=<an association> compares a queried entity with a given association—the association must be of type Association to <queried entity>[. . . ]. This expands to a WHERE clause corresponding to the ON condition resolved from the association. In this case it would actually resolve to:

```
SELECT * FROM Address this
    WHERE   this.zipCode = daniel.homeAddress.zipCode
    AND     this.streetAddress = daniel.homeAddress.streetAddress
    AND     this.type = 'home';
```

Embodiments may also allow the use of SELECT from association. Specifically, association-traversal code patterns like the one below are frequently seen:

SELECT * from Address WHERE this=daniel.homeAddress;

An association in general, and a programming language variable with association type support in particular, carries all information about a target record—essentially providing information as to which entity goes with which key. Thus equivalent to the query above, embodiments allow the short-hand below for traversing associations:

SELECT * from daniel.homeAddress;

In general, a query statement of the form SELECT . . . from <someAssociation> expands to:

```
SELECT ... from <someAssociation>.<targetEntity> WHERE
    this=<someAssociation>;
```

Here, <targetEntity> signifies the metadata associated with the association corresponding to the target entity specified in the association's declaration using the ON targetEntity clause.

JOINs Declare ad-hoc Associations

Embodiments allow JOINs to declare ad-hoc associations. In the case of a missing association, the standard JOIN <target> ON <join condition> clauses as introduced in SQL-92 are still supported, which align with the extensions introduced above, as they naturally introduce associations in an ad-hoc fashion.

For example, in the data model given above, the entity Employee has an association homeAddress, but is lacking a similar association for businessAddress, which can be compensated for using a standard JOIN clause as follows:

```
SELECT FROM Employee e
ASSOCIATION TO Employee2Address e2a ON
e2a.employee = e
ASSOCIATION TO Address businessAddress ON _id =
e2a.address._id AND kind=business
{
ID, name,
businessAddress { streetAddress, zipCode, city }
}
```

The expression may follow the syntax below:

```
JoinClause += | JOIN targetEntity [[AS] Identifier ]
JoinConditionClauses
```

Other syntax is as discussed above in connection with associations in DDL.

JOIN clauses fit easily into the extensions in DDL and QL. JOIN clauses can be interpreted as an ad-hoc definition of missing associations.

In the example immediately above, the association businessAddress is added. This result is recognized if the projection clause of the example above, is compared to that of the query applied to the domain model if the association were in place (below):

```
SELECT FROM Employee {
    ID, name,
    businessAddress { streetAddress, zipCode, city }
}
```

Embodiments also allow the use of simplified JOIN clauses. In particular, following the observation that JOINs essentially declare ad-hoc associations, embodiments JOINs to be declared using the same clauses that are used to declare associations in DDL. Given this, the above example can be written more easily as follows:

```
SELECT FROM Employee e
ASSOCIATION TO Address businessAddress VIA entity
Employee2Address
WHERE kind=business
{
ID, name,
businessAddress { streetAddress, zipCode, city }
}
```

Figure 6:
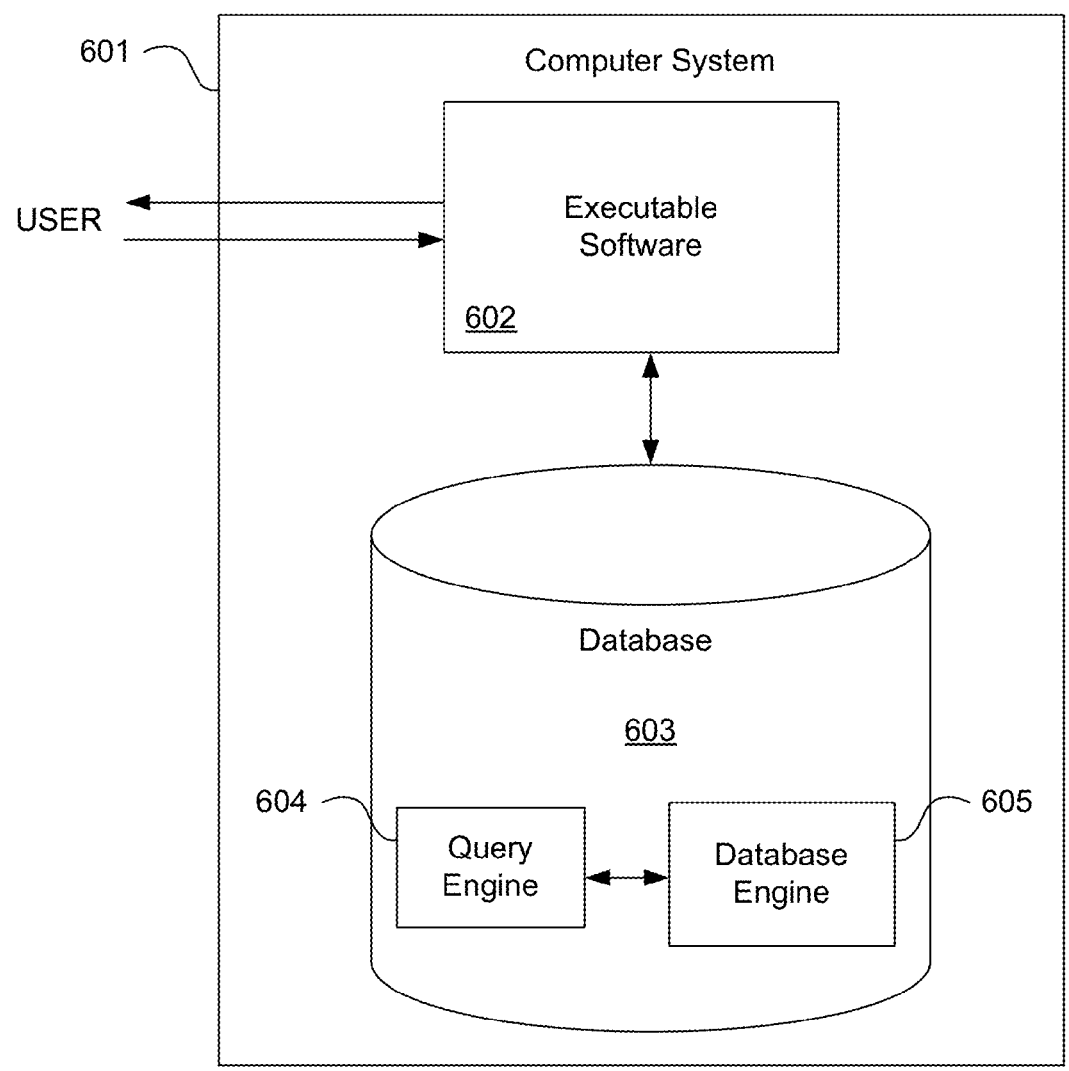
FIG. 6 illustrates hardware of a special purpose computing machine configured to extend database entity-relationship models execution, according to an embodiment.

FIG. 6 illustrates hardware of a special purpose computing machine configured to extend database entity-relationship models according to an embodiment. In particular, computer system 600 comprises a processor 602 that is in electronic communication with a non-transitory computer-readable storage medium 603. This computer-readable storage medium has stored thereon code 604 corresponding to a query engine. Code 605 corresponds to a database engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 7:
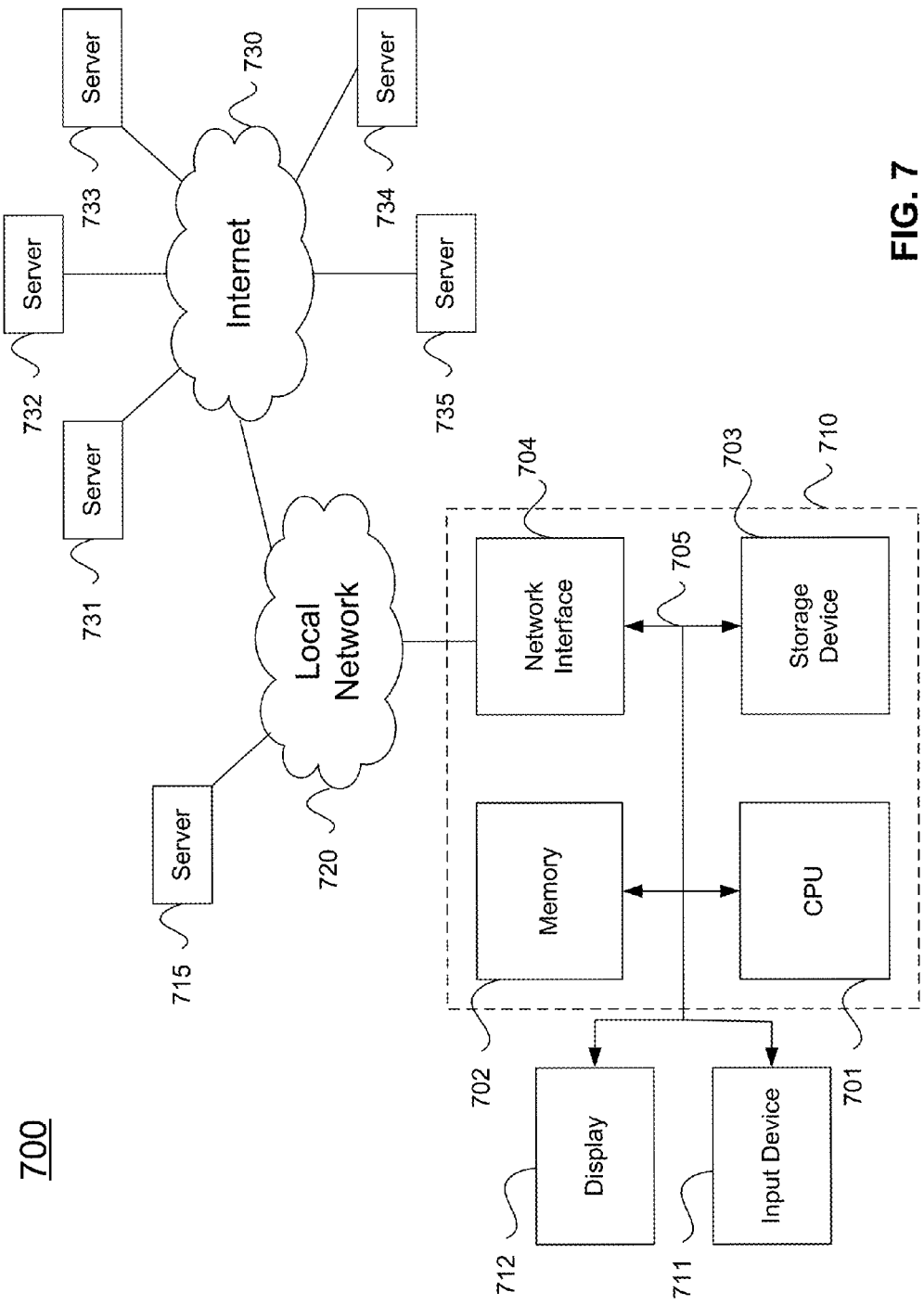
FIG. 7 illustrates an example of a computer system.

An example system 700 is illustrated in FIG. 7. Computer system 710 includes a bus 705 or other communication mechanism for communicating information, and a processor 701 coupled with bus 705 for processing information. Computer system 710 also includes a memory 702 coupled to bus 705 for storing information and instructions to be executed by processor 701, including information and instructions for performing the techniques described above, for example. This memory may also be used for storing variables or other intermediate information during execution of instructions to be executed by processor 701. Possible implementations of this memory may be, but are not limited to, random access memory (RAM), read only memory (ROM), or both. A storage device 703 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 703 may include source code, binary code, or software files for performing the techniques above, for example. Storage device and memory are both examples of computer readable mediums.

Computer system 710 may be coupled via bus 705 to a display 712, such as a cathode ray tube (CRT) or liquid crystal display (LCD), for displaying information to a computer user. An input device 711 such as a keyboard and/or mouse is coupled to bus 705 for communicating information and command selections from the user to processor 701. The combination of these components allows the user to communicate with the system. In some systems, bus 705 may be divided into multiple specialized buses.

Computer system 710 also includes a network interface 704 coupled with bus 705. Network interface 704 may provide two-way data communication between computer system 710 and the local network 720. The network interface 704 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 704 sends and receives electrical, electromagnetic, or optical signals that carry digital data streams representing various types of information.

Computer system 710 can send and receive information, including messages or other interface actions, through the network interface 704 across a local network 720, an Intranet, or the Internet 730. For a local network, computer system (710 may communicate with a plurality of other computer machines, such as server 715. Accordingly, computer system 710 and server computer systems represented by server 715 may form a cloud computing network, which may be programmed with processes described herein. In the Internet example, software components or services may reside on multiple different computer systems 710 or servers 731-735 across the network. The processes described above may be implemented on one or more servers, for example. A server 731 may transmit actions or messages from one component, through Internet 730, local network 720, and network interface 704 to a component on computer system 710. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
    defining, by a computer, a constraint on an object of a data model, the data model being configured to define the object as a logical grouping of elements from an underlying database and the constraint being configured to execute a routine to validate an element of the object when a triggering event associated with the object is detected;
    compiling, by the computer, the constraint into a runtime artifact associated with the object;
    querying, by the computer, the underlying database to form a projection of the object that includes a subset of the logical grouping of elements; and
    executing, by the computer, the runtime artifact when the triggering event is detected on the projection.

2. The computer-implemented method of claim 1, wherein the data model is specified in a domain specific language and the routine is expressed using expressions from the domain specific language.

3. The computer-implemented method of claim 1, wherein the triggering event is explicitly calling the constraint.

4. The computer-implemented method of claim 1, wherein the triggering event is one of saving, modifying, and deleting the object.

5. The computer-implemented method as in claim 1, wherein the triggering event does not change the persistency of the underlying database.

6. The computer-implemented method of claim 1, wherein the triggering event is a change to the underlying database.

7. The computer-implemented method of claim 1, wherein validating the element includes checking a dependency between the element and another element.

8. The computer-implemented method of claim 7, wherein the another element belongs to another object of the data model.

9. The computer-implemented method of claim 1, wherein the routine is configured to output an error or warning according to a setting on the constraint.

10. The computer-implemented method of claim 1, wherein executing the runtime artifact comprises:
    determining that the element of the object to be validated by the constraint is missing from the projection of the object;
    loading the element into the projection; and
    performing the routine on the projection.

11. The computer-implemented method of claim 1, wherein executing the runtime artifact comprises:
    determining that the element of the object to be validated by the constraint is missing from the projection of the object;
    loading the object into the projection; and
    performing the routine on the projection.

12. A non-transitory computer readable storage medium storing one or more programs, the one or more programs comprising instructions for:
    defining a constraint on an object of a data model specified in a domain specific language, the data model being configured to define the object as a logical grouping of elements from an underlying database and the constraint being configured to execute a routine to validate an element of the object without changing the persistency of the underlying database when a triggering event associated with the object is detected, the routine being expressed using expressions from the domain specific language;
    compiling the constraint into a runtime artifact associated with the object;
    querying the underlying database to form a projection of the object that includes a subset of the logical grouping of elements; and
    executing the runtime artifact when the triggering event is detected on the projection.

13. The non-transitory computer readable storage medium of claim 12, wherein the triggering event is explicitly calling the constraint.

14. The non-transitory computer readable storage medium of claim 12, wherein the triggering event is one of saving, modifying, and deleting the object.

15. The non-transitory computer readable storage medium of claim 12, wherein validating the element includes checking a dependency between the element and another element.

16. The non-transitory computer readable storage medium of claim 15, wherein the another element belongs to another object of the data model.

17. The non-transitory computer readable storage medium of claim 12, wherein performing the runtime artifact comprises:
    determining that the element of the object to be validated by the constraint is missing from the projection of the object;
    loading the element into the projection; and
    performing the routine on the projection.

18. The non-transitory computer readable storage medium of claim 12, wherein executing the runtime artifact comprises:
    determining that the element of the object to be validated by the constraint is missing from the projection of the object;
    loading the object into the projection; and
    performing the routine on the projection.

19. A computer system comprising:
    a processor; and
    a non-transitory computer readable medium having stored thereon one or more programs, which when executed by the processor, causes the processor to:
    define, by a computer, a constraint on an object of a data model, the data model being configured to define the object as a logical grouping of elements from an underlying database and the constraint being configured to execute a routine to validate an element of the object when a triggering event associated with the object is detected;

compile, by the computer, the constraint into a runtime artifact associated with the object;
query, by the computer, the underlying database to form a projection of the object that includes a subset of the logical grouping of elements; and
execute, by the computer, the runtime artifact when the triggering event is detected on the projection.

20. The computer system of claim 19, wherein the data model is specified in a domain specific language and the routine is expressed using expressions from the domain specific language.

* * * * *